US012774174B2

(12) United States Patent
Müller et al.

(10) Patent No.: US 12,774,174 B2
(45) Date of Patent: Oct. 27, 2026

(54) RE-SECURING MONITORING FOR A THICK MATTER CONVEYING SYSTEM

(71) Applicant: Putzmeister Engineering GmbH, Aichtal (DE)

(72) Inventors: Ansgar Müller, Stuttgart (DE); Dennis Odukwe, Stuttgart (DE)

(73) Assignee: Putzmeister Engineering GmbH, Aichtal (DE)

( * ) Notice: Subject to any disclaimer, the term of this patent is extended or adjusted under 35 U.S.C. 154(b) by 184 days.

(21) Appl. No.: 18/696,442

(22) PCT Filed: Sep. 12, 2022

(86) PCT No.: PCT/EP2022/075276
§ 371 (c)(1),
(2) Date: Mar. 28, 2024

(87) PCT Pub. No.: WO2023/052113
PCT Pub. Date: Apr. 6, 2023

(65) Prior Publication Data

US 2024/0375891 A1 Nov. 14, 2024

(30) Foreign Application Priority Data

Sep. 28, 2021 (DE) .................... 10 2021 125 042.0

(51) Int. Cl.
*B65G 53/66* (2006.01)

(52) U.S. Cl.
CPC .................................. *B65G 53/66* (2013.01)

(58) Field of Classification Search
CPC .................................................... B65G 53/66
See application file for complete search history.

(56) References Cited

U.S. PATENT DOCUMENTS 7,012,540 B2 3/2006 Petzold et al.
2004/0119597 A1* 6/2004 Petzold .................. B66C 23/80
340/679

(Continued)

FOREIGN PATENT DOCUMENTS

CN 107572433 A 1/2018
CN 111017731 A 4/2020

(Continued)

OTHER PUBLICATIONS

PCT International Search Report and Written Opinion for International Application No. PCT/EP2022/075276 filed on Sep. 12, 2022, Date of Mailing: Jan. 4, 2023, 12 pgs.

*Primary Examiner* — Jeremy Carroll
(74) *Attorney, Agent, or Firm* — Alix, Yale & Ristas, LLP

(57) ABSTRACT

The invention discloses, inter alia, a thick matter conveying system (10), comprising a thick matter pump (16) for conveying thick matter, a thick matter distributor boom (18) for distributing the thick matter to be conveyed, the thick matter distributor boom (18) having a boom arrangement (40) comprising at least two boom arms (41), a substructure (30) on which the thick matter distributor boom (18) and the thick matter pump (16) are arranged, the substructure (30) comprising a supporting structure (31) for supporting the substructure (30) having at least one horizontally and/or vertically movable supporting leg (32), the supporting structure (31) having a stability region with a re-securing threshold and with an upper limit defined by a maximum stability parameter, and the at least one supporting leg (32) being able to be re-secured, a receiving unit (11) for receiving at least one item of operating information, a processing unit (12) for determining a stability parameter of the thick matter conveying system (10) depending on the at least one item of operating information received, and a control unit (13) for (Continued)

outputting a first control signal if the determined stability parameter of the thick matter conveying system (10) lies above the re-securing threshold, outputting of the first control signal suppressing re-securing of the at least one supporting leg (32).

13 Claims, 3 Drawing Sheets

(56) References Cited

U.S. PATENT DOCUMENTS

| | | | | |
|---|---|---|---|---|
| 2017/0144635 | A1 | 5/2017 | Mayer et al. | |
| 2020/0109040 | A1 | 4/2020 | Bell | |
| 2021/0009388 | A1 * | 1/2021 | Lutzeyer | B66F 17/006 |
| 2021/0010281 | A1 | 1/2021 | Müller | |
| 2022/0297988 | A1 * | 9/2022 | Artoni | B66C 13/20 |
| 2023/0312259 | A1 * | 10/2023 | Carrasco | B65G 53/66<br>198/759 |
| 2024/0183123 | A1 * | 6/2024 | Noda | E02F 9/262 |

FOREIGN PATENT DOCUMENTS

| | | | |
|---|---|---|---|
| DE | 10110176 | A1 | 9/2002 |
| DE | 202006017724 | U1 | 4/2008 |
| DE | 202015005365 | U1 | 11/2016 |
| DE | 102018204079 | A1 | 9/2019 |
| EP | 1925585 | A1 | 5/2008 |
| EP | 1849931 | B1 | 11/2016 |
| EP | 3670425 | A1 | 6/2020 |
| JP | S50117120 | A | 9/1975 |
| JP | 2017530273 | A | 10/2017 |
| WO | 2019175400 | A1 | 9/2019 |

* cited by examiner

RE-SECURING MONITORING FOR A THICK MATTER CONVEYING SYSTEM

BACKGROUND

The present invention relates, amongst other things, to a thick matter conveying system comprising a thick matter pump, a thick matter distributor boom, a receiving unit, a processing unit and a control unit.

In the practical operation of a thick matter conveying system, situations can arise in which the stability of a thick matter conveying system which has been previously positioned in a stable manner is reduced or even lost. This can be caused, in particular, by external factors such as for example by movements of the substrate on which the thick matter conveying system is positioned or by a change in the maximum footprint available for the thick matter conveying system during operation, this being reduced for example. However, it is also possible that the stability is no longer provided to a sufficient degree due to internal factors. For example, a thick matter conveying system can be positioned in a stable manner for a specific mode of operation in which the thick matter distributor boom is not deflected to a maximum degree but only to a limited extent. If, however, from this state a further operating mode is intended to be implemented above the limited deflection extent, the stability has to be ensured or produced first for this further operating mode.

In these cases, generally either the inclination of the substructure of the thick matter conveying system is adapted by vertically changing the position of at least one supporting leg of the thick matter conveying system or the footprint is changed by horizontally changing the position of at least one supporting leg. Generally, a horizontal change in position comprises at least one vertical change in position in which the supporting leg is relieved of load, so that it no longer contributes to the footprint. Both methods comprise the actuation of at least one supporting leg so that they can also be encompassed under the collective term “re-securing”.

Generally, for the re-securing the user actuates the supporting leg hydraulics with levers which act directly on the hydraulic valves and in this manner manually changes the vertical and/or horizontal supporting leg position. It is a drawback that the stability of the thick matter conveying system can be significantly reduced or even lost by the re-securing, in particular during the re-securing process, so that there is the risk that the thick matter conveying system tips over. The user can only estimate using their individual experience as to whether it is possible to carry out re-securing during a current operation of a thick matter conveying system. Thus in conventional systems such re-securing can take place only in a stepwise manner and in very small steps, wherein the user has to re-evaluate the status of the stability of the thick matter conveying system after each step. Due to the need to involve the user, it may not be possible to react in good time to dynamic changes in the stability. Moreover, in the case of a misjudgement, it is possible that there is no longer any stability so that the thick matter conveying system threatens to tip over.

SUMMARY

Against the background of the aforementioned drawbacks, an object of the present invention, therefore, is to provide an improved thick matter conveying system and an improved method for operating a thick matter conveying system.

The solution according to the invention is found in the features of the independent claims. Advantageous developments form the subject matter of the dependent claims.

A thick matter conveying system is disclosed according to the invention, comprising a thick matter pump for conveying thick matter and a thick matter distributor boom for distributing the thick matter to be conveyed, wherein the thick matter distributor boom has a boom arrangement comprising at least two boom arms, a substructure on which the thick matter distributor boom and the thick matter pump are arranged, wherein the substructure comprises a supporting structure for supporting the substructure with at least one horizontally and/or vertically movable supporting leg, wherein the supporting structure has a stability range with a re-securing threshold and with an upper limit defined by a maximum stability parameter, and wherein the at least one supporting leg is able to be re-secured, a receiving unit for receiving at least one item of operating information, a processing unit for determining a stability parameter of the thick matter conveying system depending on the at least one item of operating information received, and a control unit for outputting a first control signal if the determined stability parameter of the thick matter conveying system lies above the re-securing threshold, wherein the outputting of the first control signal suppresses re-securing of the at least one supporting leg.

The thick matter conveying system according to the invention is, for example, a truck-mounted concrete pump.

The invention is a particularly advantageous embodiment of a thick matter conveying system with a dynamic and situation-dependent monitoring of whether the stability of the thick matter conveying system is present for carrying out re-securing process. Re-securing is then intended to be made possible when a sufficient stability of the thick matter conveying system is ensured, even during the re-securing process, which is why the monitoring is advantageously carried out on the basis of determining a corresponding stability parameter. A general limitation is not required, for example in the sense of a maximum number of re-securing processes. If such a stability parameter which is above a re-securing threshold is determined, the prevailing stability of the thick matter conveying system is not sufficient for re-securing, for example, since carrying out a horizontal change in position of a supporting leg would have too negative an effect on, i.e. reduce, the footprint. Accordingly, it is provided in this case that re-securing is suppressed. Thus the monitoring can be carried out in a reliable manner independently of the user and the individual experience thereof.

In this manner, firstly the risk of the thick matter conveying system tipping over and thus the damage associated therewith can be effectively reduced. Secondly, the thick matter conveying system is also able to exploit its full potential for possible re-securing processes as required, in terms of the quality and quantity thereof. The available range of the thick matter conveying system can thus be effectively maximized without additional components or supplementary parts being required for the thick matter conveying system.

Firstly, a few terms are explained below:

Thick matter is a generic term for media which are difficult to convey. The thick matter can be, for example, a substance with coarse-grained components, a substance with aggressive components, or the like. The thick matter can also be a bulk material. In one embodiment, the thick matter is fresh concrete. Fresh concrete can contain grains up to a size of more than 30 mm, which hardens and forms deposits in dead spaces, and for these reasons is difficult to convey. Exemplary thick matters are concrete having a density of 800 $kg/m^3$ to 2300 $kg/m^3$ or heavy concrete having a density of more than 2300 $kg/m^3$.

The thick matter pump can comprise a core pump with two, for example exactly two, delivery cylinders. Then it is switched alternately from the first to the second delivery cylinder and from the second to the first delivery cylinder. An S-shaped tube can be cyclically switched between the delivery cylinders. Moreover, an additional cylinder can be designed such that it bridges each of the transitions.

The boom arrangement comprises at least two boom arms but it can also comprise three, four or five boom arms. Typically, the boom arrangement comprises three to seven boom arms. A boom arm can be connected at its proximal end to a slewing gear of the thick matter conveying system and at its distal end to the proximal end of an adjacent boom arm. The one or more further boom arms are arranged in series and in each case connected at their proximal end to a distal end of the adjacent boom arm. The distal end of the boom arm which is last in the series, and which also has no further connection at its distal end, defines a possible load attachment point.

The boom arms are connected together in each case via a boom joint such that they can be moved at least, for example exclusively, in a dimension at least independently of the remaining boom arms. The boom joint is assigned to each boom arm at its proximal end.

The connection of the one boom arm to the slewing gear can be designed such that with a rotation of the slewing gear about an axis, this boom arm or all of the boom arms can also be rotated about this axis. For example, the boom arm is fastened to the slewing gear such that the boom arm can be moved, for example exclusively, in the vertical direction independently of the slewing gear and, for example, can be rotated via its boom joint. It is also conceivable that a boom arm has a telescopic functionality and can be lengthened or shortened telescopically and steplessly along its longitudinal axis. A boom arm is adjustable, for example, such that at least the distal end of the boom arm can be moved at least in one of the three spatial directions (x-direction, y-direction and z-direction).

Alternatively or additionally, a boom arm can be rotatable about its longitudinal axis. For example, a boom arm comprises at least one actuator for its boom joint, such as for example a hydraulic or pneumatic cylinder, or an electromechanical actuator or a combination of a plurality of, even different, types of actuator by which it can change its position relative to at least one other boom arm, in particular the boom arm connected to the proximal end. The actuators can be designed, for example, to pivot the boom arm rotationally about a horizontal axis which runs, for example, through its boom arm joint and/or to move the boom arm translationally in one, in two or in all spatial directions.

Alternatively or additionally, the boom arm can have further actuators, the boom arm being able to be lengthened or shortened or rotated telescopically, for example.

The substructure is a basic framework, for example a chassis, on which the thick matter distributor boom and the thick matter pump are arranged. For example, the thick matter distributor boom and/or thick matter pump are fastened to the substructure. The substructure can be configured to be stationary (for example as a platform) or mobile (for example as a vehicle). By the arrangement of the thick matter distributor boom and thick matter pump on the substructure, the entire thick matter conveying system can be configured to be particularly compact as a unit and, for example, in the form of a truck-mounted concrete pump.

The thick matter conveying system comprises means for performing or controlling the method according to the invention. These means comprise, in particular, the receiving unit, the processing unit and the control unit and can be configured in each case as hardware and/or software components which are separate or combined in different combinations. The means comprise, for example, at least one memory with program instructions of a computer program and at least one processor configured for executing program instructions from the at least one memory.

The receiving unit of the thick matter distributor boom, the thick matter pump and thick matter conveying system is designed in each case to receive at least one item of operating information. The operating information is indicative of a property of a plurality of possible properties of the thick matter distributor boom, the thick matter pump and the thick matter conveying system or the components thereof and is representative of this property. Operating information is thus intended to be able to be assigned to a component. Such a property, as well as the operating parameter, can be characterized by a measured variable for example. This can be properties which already start to emerge before the conveying or only after the conveying is started. For example, operating information can be received by measuring a measured variable characteristic of this operating information. The operating information received by the receiving unit can also predetermine or result from a previous calculation into which, for example, in turn one or more measured variables are input. It is conceivable that such a previous calculation is made directly in situ in a correspondingly designed unit of the thick matter distributor boom, the thick matter pump and the thick matter conveying system, but it can also be carried out externally, for example on a server device, and the operating information thus calculated then received by the receiving unit.

The processing unit is intended to be understood to be designed for determining a stability parameter of the thick matter conveying system. This is intended to take place at least partially as a function of the at least one item of operating information received. For example, the processing unit can have access to the information received by the receiving unit. Determining the stability parameter is intended to be understood to mean that the stability parameter is calculated as a function of the received operating information on the basis of predetermined properties, which are assumed to be constant, of components of the thick matter conveying system, such as the mass thereof or the spatial extent thereof. Additionally, it is also possible to take into account further properties, such as for example the positioning of supporting legs to one another, the influence of wind areas of the components and predetermined safety or limit values.

The substructure comprises a supporting structure for supporting the substructure with at least one horizontally and/or vertically movable supporting leg. A supporting leg of a thick matter conveying system represents a component of the supporting structure which serves for increasing the stability of the thick matter conveying system. The influence of the supporting structure on the stability is, in particular, dependent on an individual arrangement and positioning of supporting legs. The supporting leg can be supported on a substrate with a support plate. Generally four supporting legs are provided in a supporting structure.

The stability of the supporting structure, and thus of the entire thick matter conveying system, is all the higher the greater the distance of the line of action, which considers all forces acting on the thick matter conveying system, from the tipping edges of this surface. A reliable statement about the stability, however, can be already made when taking as a basis a line of action which considers at least the weight force acting on the thick matter conveying system. The more forces actually acting in the line of action which are considered, the more precisely this statement can be made. Thus the stability of the thick matter conveying system can be particularly advantageously characterized by a stability parameter representing the distance of the line of action from the tipping edges of the footprint. The stability parameter is within a predetermined or dynamically determinable stability range within which the distance of the line of action from each of the tipping edges is greater than or equal to zero, and preferably a safety reserve is also considered. The stability of the supporting structure and thus the thick matter conveying system is provided within the stability range. The upper limit of the stability range is defined by a maximum stability parameter. The maximum stability parameter is present when the distance of the line of action from one of the tipping edges is zero. Accordingly the distance of the line of action from at least one of the tipping edges decreases with an increasing stability parameter. Above the upper limit, the distance is less than zero and the stability is no longer provided. It is conceivable that a stability range for each operating situation of the thick matter conveying system is predetermined or can be determined, for example, by considering properties, which are assumed to be constant, of the components of the thick matter conveying system to be considered. For example, a footprint can be predetermined or determined for each possible arrangement of the supporting structure, for example by a specific positioning of supporting legs. The stability range also comprises a re-securing threshold and optionally also a switch-off threshold. For example, the switch-off threshold can be closer to the maximum stability parameter and thus closer to the upper limit of the stability than the re-securing threshold. Accordingly during the deflection of a boom arrangement of a thick matter distributor boom to edge positions, due to the torque acting thereby on the supporting structure it leads first to the re-securing threshold being exceeded and then the switch-off threshold, and then the upper limit.

The distance of the line of action from one of the tipping edges and the position of the line of action are calculated in each case at least as a function of the weight force of the thick matter conveying system and can be calculated by the processing unit, for example. The position of the line of action can have vertical and horizontal directional components and can be a function of the directions of action and/or the values of a plurality of forces. For example, one or more forces to be considered can be predetermined or selected by a user (for example by means of a suitable user interface). If, for example, only the weight force of a thick matter conveying system is considered, then the line of action corresponds to vertical line running through the overall center of gravity. The position of the line of action is thus equal to the position of the vertical line. If the position of the line of action is additionally dependent on a force which has a horizontal component, such as for example a wind force acting on the thick matter conveying system from the side, then the position of the line of action also comprises at least one horizontal component and its position is unequal to the vertical line. It is conceivable that in such a manner the position of the line of action is dependent on one or more further forces, such that the processing unit can adapt the position in a stepwise manner, preferably only when one or more specific conditions are met, for example above a prevailing wind speed during the operation of the thick matter conveying system, for example in each case by a predetermined value in a predetermined direction. It is also conceivable that the position of the line of action depends on the directions of action and/or values of one or more items, preferably all items, of operating information received by the receiving unit and indicative of the forces.

For example, the stability range can be described as a distance reserve which has a minimum value at which, when exceeded, the stability of the support structure is no longer provided. Thus any movement of a component can lead to a reduction in the distance reserve, for example when deflecting a boom arm of a thick matter distributor boom in the distal direction, or an increase in the distance reserve, once again for example when deflecting a boom arm in the proximal direction. If the distance reserve is used up, a maximum stability parameter is present and the upper limit of the stability range is reached. If the operation of the relevant component is such that it is to be expected that the distance reserve increases, such an operation optionally can take place at reduced speed.

The control unit comprises corresponding means in order to output control signals, such as for example a wired or wireless signal output. By the output of control signals in the described manner, the control unit can activate at least one component of the thick matter conveying system and act on an operating parameter of the component and, in particular by the output of a first control signal, suppress re-securing of the at least one supporting leg. An optional output of further control signals can take place alternatively or additionally to the output of the first control signal.

For example, the receiving unit is designed to receive operating information which is indicative of a joint torque of a boom arm, of a cylinder force of a boom arm of the thick matter conveying system, of an angle of inclination of at least one boom arm, of an actuator force of at least one actuator of a boom arm, of an operating speed of at least one actuator of a boom arm, of a load weight on a load attachment point of the thick matter distributor boom, of a rotational speed of a slewing gear, of an angle of inclination of the thick matter conveying system, of an excavation of the thick matter conveying system, of a position of the at least one supporting leg and/or of a horizontal and/or a vertical leg force of the at least one supporting leg.

The joint torque of a boom arm is the torque acting on the boom joint thereof. This represents a torque which, amongst other things, is dependent on the total weight of the boom arrangement, on wind loads, on the weight of a currently conveyed thick matter or even on a weight acting on the distal end of the first boom arm of the boom arrangement, corresponding to a boom peak load. The joint torque can be measured, for example, by measuring a cylinder force acting in the actuator of the boom arm or a cylinder pressure acting in the actuator of the boom arm in combination with one or more measurements, such as for example a measurement of the respective joint angle. For example, the joint torque of a boom arm can be calculated by means of a transfer function from a cylinder force and a joint angle of the boom joint of the respective boom arm. The angle of inclination of a boom arm can be an absolute angle of inclination, i.e. an angle of the position of the boom arm relative to the vertical direction, or a relative angle of inclination, i.e. a difference angle between angles of inclination of two, in particular adjacent, boom arms. In the last case, the difference angle thus corresponds to the opening angle of the distal boom arm. The load weight corresponds to the weight force acting on the load attachment point. The angle of inclination of the thick matter conveying system is intended to be an angle of the thick matter conveying system relative to the vertical direction. An excavation is present when the thick matter conveying system is carried by its supporting structure, for example the supporting legs of the supporting structure. Moreover, the excavation under consideration can be further characterized, for example, on the basis of its height. The position of the at least one supporting leg is of particular importance for determining the stability parameter, since typically it has significant influence on the shape of the footprint. In particular, the value and/or direction of the horizontal distance of the footprint of the supporting leg in the respective present operating state are considered relative to a zero position in the retracted state. Additionally, the vertical distance can also be characterized and considered. It is also conceivable that a leg position sensor is designed as a GPS sensor. A horizontal or vertical leg force is intended to be understood to mean a horizontal or vertical force acting on a supporting leg.

Further exemplary operating information is indicative of the weights of all boom arms with a filled and/or unfilled conveyor pipe, of the positions of the centers of gravity of all boom arms, of the weights of additional loads, of the positions of additional weight attachment points, of the wind forces acting on the boom arms, of the positions of the centers of wind area of all boom arms, of a weight of the substructure, of a position of the centers of gravity of the substructure and of the positions of the footprints of the supporting legs in the retracted and/or in the extended state.

The stability parameter of the thick matter conveying system can be reliably determined on the basis of these properties. This makes it possible in turn to make a reliable statement about the stability of the thick matter conveying system.

According to one embodiment, the control unit is designed to output a second control signal if the determined stability parameter is below the re-securing threshold, wherein the output of the second control signal enables the re-securing of the at least one supporting leg. For example, by the output of the second control signal the control unit can enable the components of the thick matter conveying system required for re-securing, i.e. in particular the supporting legs and the actuators thereof, to be provided for a re-securing process.

Thus it can be achieved that the possibility for re-securing the thick matter conveying system is maintained if the stability required therefor has been provided or restored. Thus it can be ensured that the stability is maintained without a general, optionally situation-independent, limitation of the possible re-securing processes being required, such as for example a predetermined maximum number of re-securing processes.

Preferably, the control unit is designed to output a third control signal if the determined stability parameter is above a switch-off threshold, wherein the output of the third control signal causes a setting of the correct operation of the thick matter distributor boom. For example, the output of the third control signal can cause the actuators of the boom arms to remain in their respective current position. It is conceivable that receipt of a confirmation on the receiving unit, for example in the form of a corresponding user input on a user interface of the receiving unit or a corresponding confirmation message on a communication interface of the receiving unit, is required for a further operation of the thick matter distributor boom after the output of the third control signal.

An additional safety level can be implemented by setting the correct operation after the output of the third control signal. For example, it is possible to suppress any operation of the thick matter distributor boom or only such an operation in which the stability of the thick matter conveying system is impaired, namely in which a stability parameter to be determined is closer to the maximum stability parameter.

Alternatively or additionally, the receiving unit is designed to receive operating information which is indicative of a horizontal and/or vertical position of the at least one supporting leg, and the processing unit is designed to determine the re-securing threshold and/or the switch-off threshold as a function of the received operating information which is indicative of the horizontal and/or vertical position of the at least one supporting leg.

Since the position of the at least one supporting leg is of particular importance for the determination of the stability parameter due to its typically significant influence on the shape of the footprint of the thick matter conveying system, a determination of the re-securing threshold and/or the switch-off threshold which is dependent on this operating information can be particularly effective. For example, the re-securing threshold and/or the switch-off threshold can be determined as a function of the value and/or direction of the horizontal distance of the footprint of the supporting leg in the respectively present operating state relative to a zero position in the retracted state. Since the influence of the supporting leg position on the footprint with a smaller value of the horizontal distance is less than with a greater horizontal distance, then the re-securing threshold and/or the switch-off threshold can be determined, for example, as being closer to the maximum stability parameter than with a larger value.

It is also conceivable that the re-securing threshold and/or the switch-off threshold are additionally determined as a function of at least one item of predicted information which is characteristic of a predicted change in the stability parameter in accordance with and during the re-securing process. In a simplified manner, a stability parameter can be predicted to this end, wherein it is assumed that the supporting leg to be re-secured is in a zero position and is extended neither horizontally nor vertically and no vertical leg force is present. The predicted change can be concluded by comparing the determined stability parameter and the predicted stability parameter. For example, with a small predicted change the re-securing threshold and/or the switch-off threshold can be determined as being closer to the maximum stability parameter than with a greater predicted change.

This permits a dynamic and situation-adapted determination of the re-securing threshold and/or switch-off threshold so that the control unit can always consider optimized values of the re-securing threshold and/or switch-off threshold for the current operating state. As a result, the thick matter conveying system can be operated even more efficiently.

In a further embodiment, the at least one supporting leg is able to be re-secured repeatedly, preferably a maximum of four times.

The option of repeated re-securing opens up the possibility of continuing the conveying operation of the thick matter conveying system substantially without interruption, even with changeable scenarios. For example, a continued operation can also be achieved on a substrate which subsides over time or in the event of increasing wind. Moreover, a spontaneously required and unplanned expansion of the working range of the thick matter distributor boom from the ongoing operation can be made possible by means of repeated re-securing without re-positioning the thick matter conveying system.

At the same time, it is advantageous to fix a maximum number of re-securing processes. In this manner, the monitoring of the positioning of the thick matter conveying system can be required at least according to a predetermined number of re-securing processes carried out, which means an additional monitoring opportunity when operating the thick matter conveying system and further increases the operational reliability. In practice, a maximum number of four re-securing processes has proved advantageous.

Additionally, the receiving unit can be designed to receive operating information which is indicative of an angle of inclination of the substructure, the processing unit can be designed to determine a maximum permitted number of re-securing processes as a function of the received operating information which is indicative of the angle of inclination of the substructure, and the control unit can be designed to output the first control signal if a number of re-securing processes carried out corresponds to the maximum permitted number.

The ratio between the overall center of gravity of the thick matter conveying system and the footprint thereof, and thus also the stability, is significantly influenced by the angle of inclination of the substructure. The effect of the re-securing processes on the ratio between the overall center of gravity and the footprint is also dependent on the angle of inclination of the substructure. Thus it is advantageous to determine the maximum number of permitted re-securing processes as a function of the angle of inclination of the substructure.

Advantageously, the processing unit is designed to determine a maximum permitted number of four re-securing processes if the operating information which is indicative of the angle of inclination of the substructure (30) characterizes an angle of inclination with a value of a maximum of 1° and/or wherein the processing unit is designed to determine a maximum permitted number of three re-securing processes if the operating information which is indicative of the angle of inclination of the substructure characterizes an angle of inclination with a value of a maximum of 2° and/or wherein the processing unit is designed to determine a maximum permitted number of two re-securing processes if the operating information which is indicative of the angle of inclination of the substructure characterizes an angle of inclination with a value of a maximum of 2.5° and/or wherein the processing unit is designed to determine a maximum permitted number of one re-securing process if the operating information is indicative of the angle of inclination of the substructure (30) characterizes an angle of inclination with a value of a maximum of 3°.

These values have proved to be particularly advantageous in practice.

According to one exemplary embodiment, the receiving unit comprises a sensor unit for detecting operating information, a communication interface for detecting operating information or a user interface for detecting operating information.

By using a sensor unit, the receiving unit can detect operating information automatically and independently of a user input. The sensor unit can comprise one or more sensors of the same or different type. Exemplary sensors are force and pressure sensors (for example for detecting a cylinder force of a boom joint of a boom arm, a force acting on an actuator of a boom arm or the load of the end hose), positioning sensors (for example sensors of a satellite-assisted positioning system such as GPS, GLONASS or Galileo), position sensors (for example spirit levels or inclination sensor systems for detecting an angle of inclination of a boom arm), electric sensors (for example induction sensors), optical sensors (for example laser sensors or 2D scanners) or acoustic sensors (for example ultrasonic sensors) for example for detecting the density of the thick matter to be conveyed. Equally, operating information can also be detected by a cooperation of a plurality of sensors of the sensor unit.

Alternatively or additionally, the respective receiving unit can also comprise one or more (for example wireless) communication interfaces by which the (for example externally) detected operating information can be received by the receiving unit in the manner known by the person skilled in the art.

If a user interface is provided for detecting operating information, this can be configured, for example, as at least one button, a keypad, a keyboard, a mouse, a display unit (for example a display), a microphone, a touchsensitive display unit (for example a touchscreen), a camera and/or a touchsensitive surface (for example a touchpad). For example, the operating information is received by detecting a user input on the user interface.

According to the invention, a method is also disclosed for operating a thick matter conveying system comprising a thick matter pump for conveying a thick matter, a thick matter distributor boom for distributing the thick matter to be conveyed, wherein the thick matter distributor boom has a boom arrangement comprising at least two boom arms, a substructure on which the thick matter distributor boom and the thick matter pump are arranged, wherein the substructure comprises a supporting structure for supporting the substructure with at least one horizontally and/or vertically movable supporting leg, wherein the supporting structure has a stability range with a re-securing threshold and with an upper limit defined by a maximum stability parameter, and wherein the at least one supporting leg can be re-secured, and comprising a receiving unit, a processing unit and a control unit, wherein the method comprises the following steps: receiving, by the receiving unit, at least one item of operating information; determining, by the processing unit, a stability parameter of the thick matter conveying system as a function of the at least one item of operating information received; and outputting, by the control unit, a first control signal for suppressing re-securing of the at least one supporting leg if the determined stability parameter of the thick matter conveying system is above the re-securing threshold, wherein the outputting of the first control signal suppresses re-securing of the at least one supporting leg.

In one embodiment, the method further comprises the step: outputting, by the control unit, a second control signal if the determined stability parameter is below the re-securing threshold, wherein the outputting of the second control signal enables there-securing of the at least one supporting leg.

In a further embodiment the method further comprises the step: outputting, by the control unit, a third control signal if the determined stability parameter is above the switch-off threshold, wherein the outputting of the third control signal causes a setting of the correct operation of the thick matter distributor boom.

For a more detailed explanation of further advantageous developments of the method, reference is made to the above-described developments of the thick matter conveying system.

The invention also comprises a computer program with program instructions to cause a processor to carry out and/or control the method according to the invention when the computer program is executed on the processor. The computer program according to the invention is stored, for example, on a computer-readable data carrier.

The above-described embodiments and designs are merely to be understood by way of example and are not intended to limit the present invention in any way.

BRIEF DESCRIPTION OF THE DRAWINGS

The invention is described in more detail hereinafter by way of example with reference to the accompanying drawings on the basis of advantageous embodiments. In the drawings.

DETAILED DESCRIPTION

Figure 1:
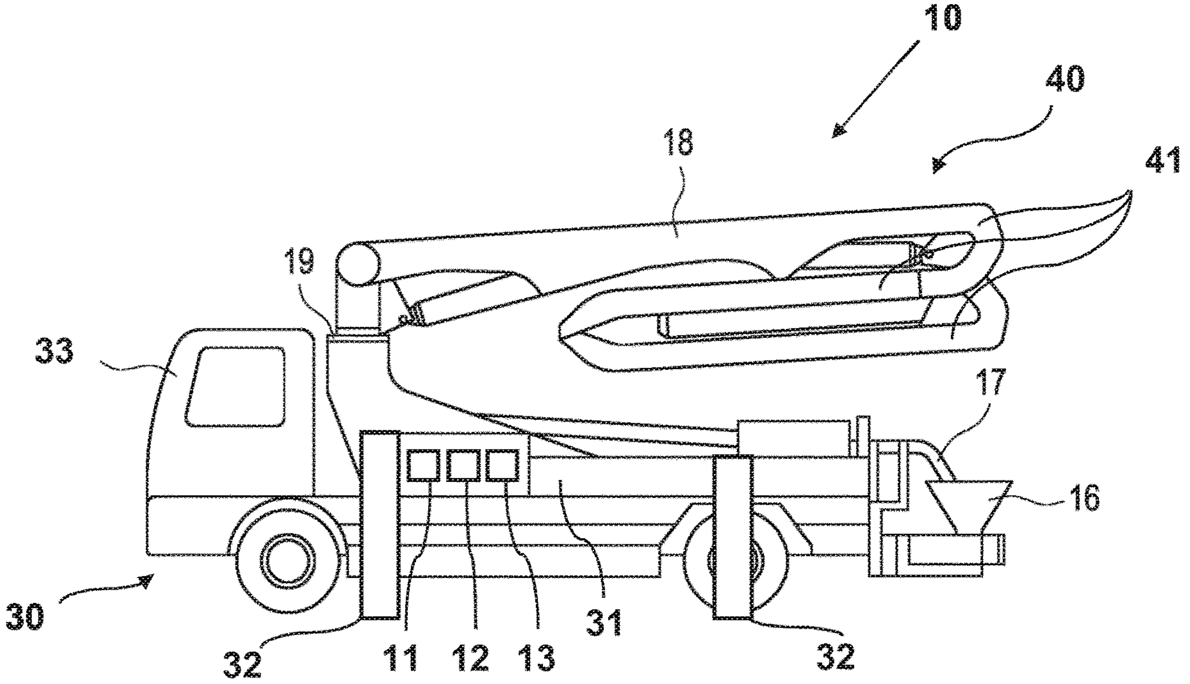
FIG. 1 shows a schematic view of an exemplary embodiment of a thick matter conveying system according to the invention in a side view.
Figure 2:
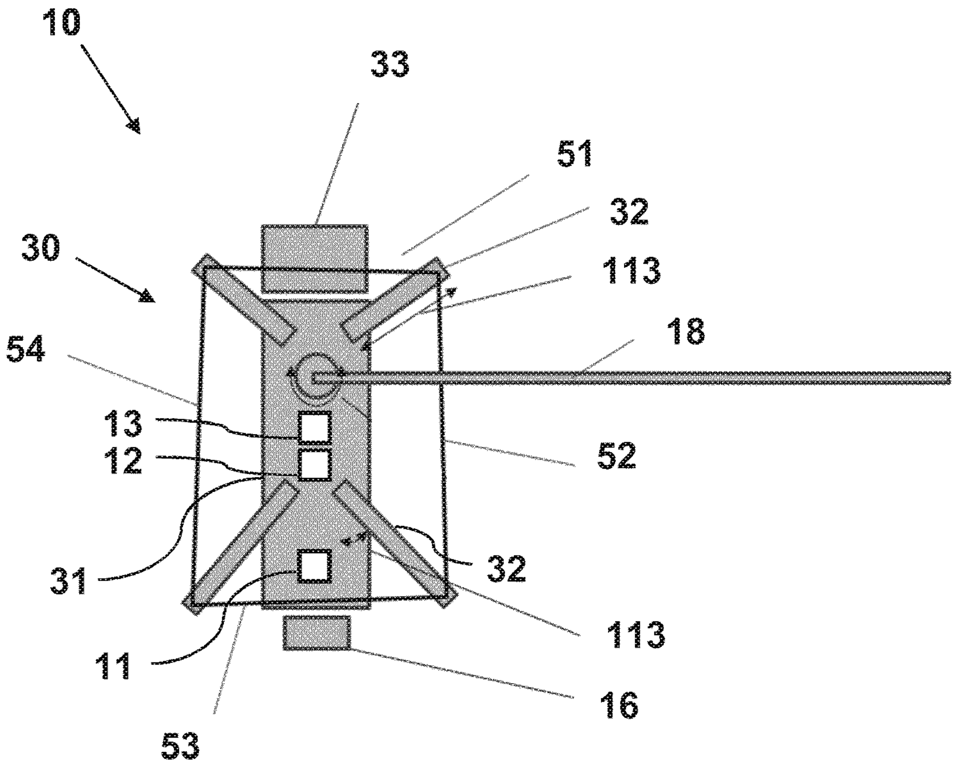
FIG. 2 shows a schematic view of an exemplary embodiment of a thick matter conveying system according to the invention in a plan view.

A thick matter conveying system 10, which comprises a thick matter pump 16 for conveying a thick matter and a thick matter distributor boom 18 for distributing the thick matter to be conveyed, is shown in FIGS. 1 and 2 in each case, wherein the thick matter distributor boom 18 has a slewing gear 19 which can be rotated about a vertical axis and a boom arrangement 40 comprising boom arms 41. A conveyor pipe 17, which extends via the boom arrangement 40 and which is connected to the thick matter pump 16, is also shown.

Moreover, the thick matter conveying system 10 comprises a substructure 30 on which the thick matter distributor boom 18 and the thick matter pump 16 are arranged. The substructure 30 has a supporting structure 31 with four supporting legs 32 for supporting the substructure 30. The substructure 30 is shown by way of example arranged on a vehicle 33.

Moreover, a receiving unit 11, a processing unit 12 and a control unit 13 are provided. The receiving unit 11 is designed to receive at least one item of operating information. For example, to this end the receiving unit can have a sensor unit which in turn by way of example can have for each supporting leg 32 at least one sensor 113 which detects operating information which is indicative of the position of the respective supporting leg 32.

As a function of the at least one item of operating information received, i.e. for example the detected operating information which is indicative of the positions of the supporting legs 32, the processing unit 12 determines a stability parameter of the thick matter conveying system 10. The stability parameter thus determined is in a stability range within which a re-securing threshold is predetermined. Optionally a switch-off threshold can also be predetermined. Further optionally, the re-securing threshold and/or the switch-off threshold can also be determined as a function of the received operating information which is indicative of the horizontal and/or the vertical position of the at least one supporting leg.

If the processing unit 12 determines a stability parameter which is below the re-securing threshold, the control unit 13 outputs a first control signal. The first control signal causes a suppression of the re-securing of the at least one supporting leg 32 and, for example, all of the supporting legs 32 of the supporting structure 31. However, it is also conceivable that an individual re-securing threshold is considered for each of the supporting legs 32, for example as a function of the horizontal position of the respective supporting leg 32. By way of example, all of the supporting legs 32 of the supporting structure 31 can be repeatedly re-secured.

The thick matter conveying system 10 shown in FIG. 2 has four tipping edges 51, 52, 53, 54. The tipping edges 51, 52, 53, 54 are defined, in particular, by the positions of the supporting legs 32. The greater the distance of the line of action, which considers at least the weight force acting on the overall center of gravity of the thick matter conveying system 10, from the tipping edges 51, 52, 53, 54 of the footprint, the greater the stability thereof. The surface area defined by the tipping edges 51, 52, 53, 54 describes the footprint. If the overall center of gravity of the thick matter conveying system 10 approaches the edge of the footprint, i.e. one of the tipping edges 51, 52, 53, 54, for example with a particularly extensive horizontal deflection of the thick matter distributor boom 18 or when conveying a particularly heavy thick matter through the conveyor pipe 17 which extends via the boom arrangement 40, the stability of the thick matter conveying system 10 is reduced. If the line of action no longer runs within the footprint, the distance of the line of action from one of the tipping edges 51, 52, 53, 54 is less than zero and the stability of the thick matter conveying system is no longer provided.

Figure 3:
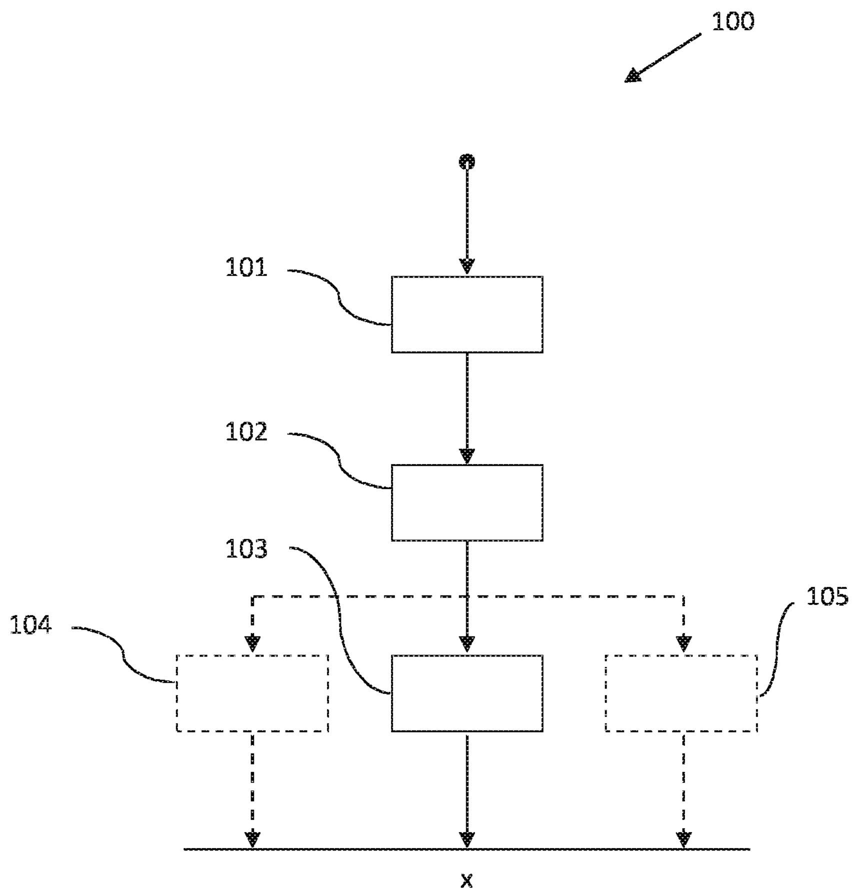
FIG. 3 shows a schematic flow diagram of an exemplary embodiment of a method according to the invention.

FIG. 3 shows a flow diagram of an exemplary embodiment of a method 100 for operating a thick matter conveying system 10.

In a method step 101 the receiving unit 11 receives at least one item of operating information. Similar to the example selected above, this operating information is intended to be indicative of the horizontal position of a supporting leg 32 and characterize, for example, the value and the direction of the horizontal distance of the footprint of the supporting leg 32 in the currently present operating state relative to a zero position in the retracted state.

As a function of this operating information and/or further operating information received in step 101, the processing unit 12 determines in step 102 a stability parameter of the substructure 30 and thus of the thick matter conveying system 10.

Then in step 103 the control unit 13 outputs a first control signal if the determined stability parameter is above the re-securing threshold of the stability range of the supporting structure 31. The output of the first control signal causes a suppression of the re-securing of the supporting leg 32.

Optionally in step 104 the control unit 13 can output a second control signal if the stability parameter determined in step 102 is below the re-securing threshold. The outputting of the second control signal enables the re-securing of the supporting leg 32.

Further optionally, in step 105 the control unit 13 can output a third control signal if the determined stability parameter is above a switch-off threshold of the stability range of the supporting structure 31. The output of the third control signal enables the re-securing of the supporting leg 32.

The embodiments of the present invention described in this specification and the optional features and properties respectively set forth in this regard are also intended to be understood as disclosed in all combinations with one another. In particular, the description of a feature encompassed by an embodiment—unless explicitly described differently—in the present case is not intended to be understood such that the feature is vital or essential for the function of the embodiment.

The invention claimed is:

1. A thick matter conveying system (10), comprising a thick matter pump (16) for conveying thick matter, a thick matter distributor boom (18) for distributing the thick matter to be conveyed, wherein the thick matter distributor boom (18) has a boom arrangement (40) comprising at least two boom arms (41), a substructure (30) on which the thick matter distributor boom (18) and the thick matter pump (16) are arranged, wherein the substructure (30) comprises a supporting structure (31) for supporting the substructure (30) with at least one horizontally and/or vertically movable supporting leg (32), wherein the supporting structure (31) has a stability range with a re-securing threshold and with an upper limit defined by a maximum stability parameter, and wherein the at least one supporting leg (32) is able to be re-secured, a receiving unit (11) for receiving at least one item of operating information, a processing unit (12) for determining a stability parameter of the thick matter conveying system (10) depending on the at least one item of operating information received, and a control unit (13) outputting a first control signal if the determined stability parameter of the thick matter conveying system (10) lies above the re-securing threshold, wherein the outputting of the first control signal suppresses re-securing of the at least one supporting leg (32).

2. The thick matter conveying system (10) of claim 1, wherein the control unit (13) outputs a second control signal if the determined stability parameter is below the re-securing threshold, wherein the output of the second control signal enables the re-securing of the at least one supporting leg (32).

3. The thick matter conveying system (10) of claim 1, wherein the control unit (13) outputs a third control signal if the determined stability parameter is above a switch-off threshold, wherein the output of the third control signal causes a setting of the correct operation of the thick matter distributor boom (18).

4. The thick matter conveying system (10) of claim 1, wherein the receiving unit (11) receives operating information indicative of a horizontal and/or vertical position of the at least one supporting leg, and wherein the processing unit (12) determines the re-securing threshold and/or the switch-off threshold as a function of the operating information indicative of the horizontal and/or vertical position of the at least one supporting leg.

5. The thick matter conveying system (10) of claim 1, wherein the at least one supporting leg (32) is able to be re-secured repeatedly.

6. The thick matter conveying system (10) of claim 5, wherein the receiving unit (11) receives operating information indicative of an angle of inclination of the substructure (30), wherein the processing unit (12) determines a maximum permitted number of re-securing processes as a function of the received operating information indicative of the angle of inclination of the substructure (30), and wherein the control unit (13) outputs the first control signal if a number of re-securing processes carried out corresponds to the maximum permitted number.

7. The thick matter conveying system (10) of claim 6, wherein the processing unit (12) determines a maximum permitted number of four re-securing processes if the operating information indicative of the angle of inclination of the substructure (30) characterizes an angle of inclination with a value of a maximum of 1° (12) and/or wherein the processing unit determines a maximum permitted number of three re-securing processes if the operating information indicative of the angle of inclination of the substructure (30) characterizes an angle of inclination with a value of a maximum of 2° and/or wherein the processing unit (12) determines a maximum permitted number of two re-securing processes if the operating information indicative of the angle of inclination of the substructure (30) characterizes an angle of inclination with a value of a maximum of 2.5° and/or wherein the processing unit (12) determines a maximum permitted number of one re-securing process if the operating information which is indicative of the angle of inclination of the substructure (30) characterizes an angle of inclination with a value of a maximum of 3°.

8. The thick matter conveying system (10) of claim 1, wherein the receiving unit (11) receives operating information which is indicative of one of the following properties:

a joint torque of at least one of the boom arms (41), a cylinder force of at least one of the boom arms (41), an angle of inclination of at least one boom arm (41), an actuator force of at least one actuator of a boom arm (41), an operating speed of at least one actuator of a boom arm (41), a load weight on a load attachment point of the thick matter distributor boom (18), a rotational speed of a slewing gear (19), an angle of inclination of the substructure (30), a position of the at least one supporting leg (32), a horizontal leg force of the at least one supporting leg (32), and a vertical leg force of the at least one supporting leg (32).

9. The thick matter conveying system (10) of claim 1, wherein the receiving unit (11) further comprising:

a sensor unit for detecting operating information, a communication interface for detecting operating information, or a user interface for detecting operating information.

10. The thick matter conveying system (10) of claim 1, wherein the substructure (30) is arranged on a vehicle (33).

11. A method (100) for operating a thick matter conveying system (10) comprising a thick matter pump (16) for conveying a thick matter, a thick matter distributor boom (18) for distributing the thick matter to be conveyed, wherein the thick matter distributor boom (18) has a boom arrangement (40) comprising at least two boom arms (41), a substructure (30) on which the thick matter distributor boom (18) and the thick matter pump (16) are arranged, wherein the substructure (30) comprises a supporting structure (31) for supporting the substructure (30) with at least one horizontally and/or vertically movable supporting leg (32), wherein the supporting structure (31) has a stability range with a re-securing threshold and with an upper limit defined by a maximum stability parameter, and wherein the at least one supporting leg (32) can be re-secured, and comprising a receiving unit (11), a processing unit (12) and a control unit (13), wherein the method comprises the following steps:

receiving (101), by the receiving unit (11), at least one item of operating information, determining (102), by the processing unit (12), a stability parameter of the thick matter conveying system (10) as a function of the at least one item of operating information received; and outputting (103), by the control unit (13), a first control signal for suppressing re-securing of the at least one supporting leg (32) if the determined stability parameter of the thick matter conveying system (10) is above the re-securing threshold.

12. The method (100) of claim 11, the method further comprising the step:

outputting (104), by the control unit (13), a second control signal if the determined stability parameter is below the re-securing threshold, wherein the outputting of the second control signal enables the re-securing of the at least one supporting leg (32).

13. The method (100) of claim 11, the method further comprising the step:

outputting (105), by the control unit (13), a third control signal if the determined stability parameter is above a switch-off threshold, wherein the output of the third control signal causes a setting of the correct operation of the thick matter boom (18).

* * * * *